UNITED STATES PATENT OFFICE.

PATRICK H. FITCH, OF YOUNGSTOWN, OHIO.

LUBRICATING COMPOUND.

SPECIFICATION forming part of Letters Patent No. 236,150, dated January 4, 1881.

Application filed August 7, 1880. (No specimens.)

*To all whom it may concern:*

Be it known that I, PATRICK H. FITCH, of the city of Youngstown, in Mahoning county and State of Ohio, have invented a new and useful Lubricating Compound, which compound is fully described in the following specification.

This invention relates to that class of compounds used to lubricate iron and steel wherever contact of parts is calculated to produce undue friction and resulting heat, particularly with reference to cutting by means of dies, as threads upon bolts and similar articles, and is intended for a substitute for the animal oil generally used.

It consists of a composition formed by mixing the following ingredients, (the parts to be by weight:) Take eight (8) parts of common soap, twenty-four (24) parts of sal-soda, (carbonate of soda,) two (2) parts of carbonate of ammonia, one (1) part of sal-ammoniac, (chloride of ammonia,) two (2) parts of red lead, to which add five (5) parts of naphtha. Dissolve the whole in one hundred and sixty (160) parts of hot water. When dissolved add four hundred and eighty (480) parts of cold water. After thoroughly mixing let the compound stand for two or three days, when it is ready for use. Before using it should be well stirred, for the purpose of evenly distributing any sediment that may have accumulated.

Instead of common soap, the ingredients thereof, in appropriate proportions, may be used. I use the soda for an alkali, for which potash, producing the same result, may be used; and instead of naphtha an equivalent hydrocarbon distillate may be used, as benzine, benzole, or common petroleum.

I claim—

A lubricating composition consisting of common soap, sal-soda, carbonate of ammonia, sal-ammoniac, red lead, naphtha, and water, substantially as described.

PATRICK H. FITCH.

Witnesses:
 F. W. ANDREE,
 SAML. FREY.